United States Patent
Park et al.

(10) Patent No.: US 11,175,789 B2
(45) Date of Patent: Nov. 16, 2021

(54) ELECTRONIC APPARATUS AND METHOD FOR CONTROLLING THE ELECTRONIC APPARATUS THEREOF

(71) Applicant: Samsung Electronics Co., Ltd., Suwon-si (KR)

(72) Inventors: Kyoungjae Park, Suwon-si (KR); Byuksun Kim, Suwon-si (KR); Jinwuk Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/682,355

(22) Filed: Nov. 13, 2019

(65) Prior Publication Data

US 2020/0150829 A1  May 14, 2020

(30) Foreign Application Priority Data

Nov. 13, 2018 (KR) .................. 10-2018-0139077

(51) Int. Cl.
*G06F 3/0481* (2013.01)
*G06K 9/62* (2006.01)
(Continued)

(52) U.S. Cl.
CPC .......... *G06F 3/0481* (2013.01); *G06F 3/0487* (2013.01); *G06K 9/6202* (2013.01);
(Continued)

(58) Field of Classification Search
None
See application file for complete search history.

(56) References Cited

U.S. PATENT DOCUMENTS

| 7,174,029 B2 | 2/2007 | Agostinelli et al. |
| 9,852,711 B2 | 12/2017 | Meijer et al. |

(Continued)

FOREIGN PATENT DOCUMENTS

| CN | 102201188 | 9/2011 |
| CN | 102541590 | 7/2012 |

(Continued)

OTHER PUBLICATIONS

Machine translation of KR 2015-0111098 A published Oct. 1, 2015, retrieved from [ip.com] on [Jun. 15, 2020]. 25 pages. (Year: 2015).*

(Continued)

*Primary Examiner* — Amy M Levy
(74) *Attorney, Agent, or Firm* — Staas & Halsey, LLP

(57) ABSTRACT

An electronic apparatus and a controlling method thereof are provided. The electronic apparatus includes a processor configured to train a UI provided by an external device through an input/output interface and store information on the UI provided by the external device in a memory, based on an image being received from the external device through the input/output interface, identify whether a UI is included in the received image, based on a UI being included in the received image, compare the UI included in the received image with the UI provided by the external device stored in the memory and identify whether the UI provided by the external device is changed, and based on identification that the UI provided by the external device being changed, retrain the UI included in the received image and store information on the UI included in the received image in the memory.

18 Claims, 14 Drawing Sheets

(51) Int. Cl.
  *G06N 20/00* (2019.01)
  *H04N 21/422* (2011.01)
  *G06T 7/70* (2017.01)
  *G06F 3/0487* (2013.01)

(52) U.S. Cl.
  CPC ......... *G06K 9/6228* (2013.01); *G06K 9/6284* (2013.01); *G06N 20/00* (2019.01); *G06T 7/70* (2017.01); *G06K 2209/25* (2013.01); *G06T 2207/20081* (2013.01); *H04N 21/4221* (2013.01); *H04N 21/42204* (2013.01); *H04N 21/42208* (2013.01)

(56) References Cited

U.S. PATENT DOCUMENTS

| | | | |
|---|---|---|---|
| 9,886,512 B2 | 2/2018 | Pu et al. | |
| 10,007,863 B1 | 6/2018 | Pereira et al. | |
| 10,110,843 B2 | 10/2018 | Kim et al. | |
| 10,140,535 B2 | 11/2018 | Lee et al. | |
| 2009/0217309 A1* | 8/2009 | Grechanik | G06F 11/3692 |
| | | | 719/328 |
| 2011/0209066 A1 | 8/2011 | Sakata et al. | |
| 2012/0099024 A1* | 4/2012 | Ryu | H04N 21/4586 |
| | | | 348/730 |
| 2012/0300061 A1 | 11/2012 | Osman et al. | |
| 2012/0314957 A1 | 12/2012 | Narikawa | |
| 2013/0195322 A1 | 8/2013 | Santhiveeran et al. | |
| 2013/0241817 A1 | 9/2013 | Wang et al. | |
| 2014/0019227 A1 | 1/2014 | Walker et al. | |
| 2014/0055675 A1* | 2/2014 | An | G08C 17/02 |
| | | | 348/569 |
| 2014/0156398 A1 | 6/2014 | Li et al. | |
| 2014/0201773 A1* | 7/2014 | Neumeier | H04N 21/435 |
| | | | 725/19 |
| 2014/0344254 A1 | 11/2014 | Pu et al. | |
| 2015/0128160 A1 | 5/2015 | Benea et al. | |
| 2015/0178780 A1 | 6/2015 | Yang et al. | |
| 2016/0034253 A1* | 2/2016 | Bang | G06F 9/451 |
| | | | 715/728 |
| 2016/0073047 A1* | 3/2016 | Yabu | H04N 21/6125 |
| | | | 348/565 |
| 2016/0148247 A1 | 5/2016 | Li et al. | |
| 2017/0032398 A1 | 2/2017 | Li et al. | |
| 2017/0039054 A1* | 2/2017 | Langton | G06N 20/00 |
| 2017/0060368 A1* | 3/2017 | Kochura | G06F 8/38 |
| 2017/0195611 A1* | 7/2017 | Yoon | H04N 21/42226 |
| 2017/0236489 A1* | 8/2017 | Oh | G09G 5/006 |
| | | | 348/727 |
| 2017/0308508 A1 | 10/2017 | Spiegel et al. | |
| 2018/0192130 A1* | 7/2018 | Liston | H04N 21/4826 |
| 2018/0203589 A1* | 7/2018 | Menand | G08C 17/02 |
| 2019/0012844 A1* | 1/2019 | Rao | H04N 21/47815 |
| 2019/0018675 A1* | 1/2019 | Ang | G06N 3/082 |
| 2019/0341149 A1* | 11/2019 | Chiu | G16H 20/30 |

FOREIGN PATENT DOCUMENTS

| | | |
|---|---|---|
| CN | 102930454 | 2/2013 |
| CN | 103493068 | 1/2014 |
| CN | 103927675 | 7/2014 |
| CN | 104603814 | 5/2015 |
| CN | 104732413 | 6/2015 |
| CN | 108513152 A | 9/2018 |
| JP | 2014-41433 | 3/2014 |
| JP | 2015-22357 | 2/2015 |
| KR | 10-2005-0083182 | 8/2005 |
| KR | 10-0643295 | 11/2006 |
| KR | 10-2011-0100008 | 9/2011 |
| KR | 10-2013-0076977 | 7/2013 |
| KR | 10-2014-0010673 | 1/2014 |
| KR | 10-1348142 | 1/2014 |
| KR | 10-2015-0048751 | 5/2015 |
| KR | 20150111098 A * | 10/2015 |
| KR | 10-2017-0033549 | 3/2017 |
| WO | WO 2014/032244 A1 | 3/2014 |

OTHER PUBLICATIONS

International Search Report dated Sep. 30, 2016, in corresponding International Patent Application No. PCT/KR2016/006572.
Written Opinion of the International Searching Authority dated Sep. 30, 2016, in corresponding International Patent Application No. PCT/KR2016/006572.
U.S. Office Action dated Sep. 5, 2017, for U.S. Appl. No. 15/191,626.
U.S. Final Office Action dated Apr. 2, 2018, for U.S. Appl. No. 15/191,626.
U.S. Notice of Allowance dated Aug. 1, 2018, for U.S. Appl. No. 15/191,626.
Chinese Office Action dated Jan. 19, 2020 in Chinese Patent Application No. 201680025841.5.

* cited by examiner

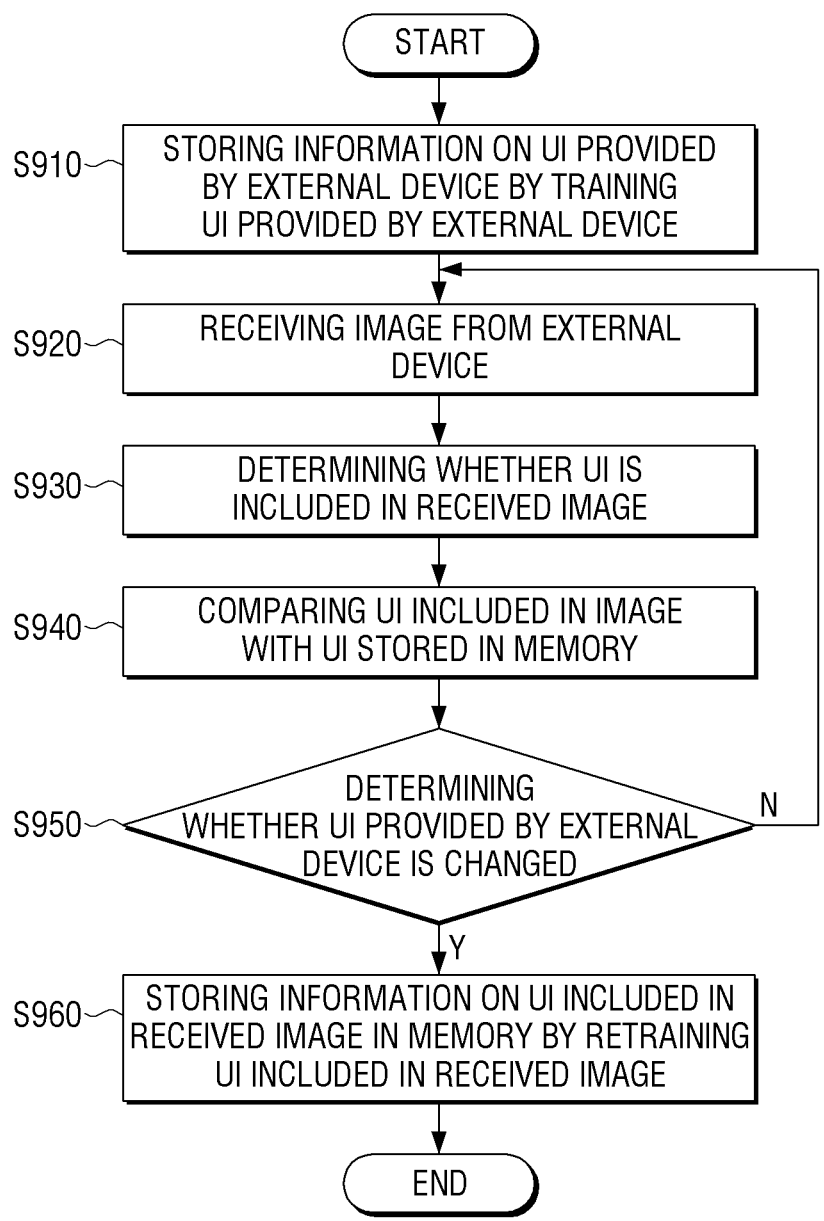

ELECTRONIC APPARATUS AND METHOD FOR CONTROLLING THE ELECTRONIC APPARATUS THEREOF

CROSS-REFERENCE TO RELATED APPLICATIONS

This application claims priority from Korean Patent Application No. 10-2018-0139077, filed on Nov. 13, 2018, in the Korean Intellectual Property Office, the disclosure of which is incorporated herein by reference in its entirety.

BACKGROUND

1. Field of the Invention

Devices and methods consistent with what is disclosed herein relate to an electronic apparatus and a controlling method thereof, and more particularly, to an electronic apparatus for sensing whether a UI provided by an external device connected through an input/output interface is changed and a controlling method thereof.

2. Description of the Related Art

Recently, an electronic apparatus controls an external device through an input/output interface. In order for the electronic apparatus to control the external device, the electronic apparatus is required to acquire information on the external device and information on the UI provided by the external device.

Conventional electronic devices recognize connected external devices (e.g., set-top boxes, Blu-ray disc players, computers, etc.) through input/output interfaces in various ways. For example, the electronic devices recognize external using a method for using information on an external device received through an input/output interface (e.g., HDMI CEC), a method of using information on Vidio Infoframe, a method of recognizing a logo or a UI included in an image provided by an external device, etc.

However, the problem lies in that, in a conventional method, the change of the external device connected to the electronic apparatus is easily recognized, but the change of the UI provided by the same external device is not easily recognized.

Conventionally, a user identifies the change of the UI of the external device that the user owns, or checks the update of the UI by visiting the website of the service provider on a regular basis in order to identify whether the UI provided by the external device is changed. However, such method requires considerable effort and time.

In addition, although the UI is changed (or updated), the update of the UI is available only in the electronic apparatus connected via Internet. Therefore, the problem lies in that changes of the UI cannot be applied to all electronic apparatuses.

SUMMARY

An aspect of the embodiments relates to providing an electronic apparatus for identifying whether a UI provided by an external device is changed by training the UI provided by the external device and a controlling method thereof.

According to an embodiment, there is provided an electronic apparatus including an input/output interface, a memory configured to store at least one instruction, and a processor configured to execute the at least one instruction, wherein the processor is further configured to train a UI provided by an external device through the input/output interface and store information on the UI provided by the external device in the memory, based on an image being received from the external device through the input/output interface, identify whether a UI is included in the received image, based on a UI being included in the received image, compare the UI included in the received image with the UI provided by the external device stored in the memory and identify whether the UI provided by the external device is changed, and based on identification that the UI provided by the external device being changed, retrain the UI included in the received image and store information on the UI included in the received image in the memory.

The processor may be further configured to train a location, and a structure of the UI provided by the external device through the input/output interface, and a logo included in the UI, and store information on the location, and the structure of the UI provided by the external device, and information on the logo included in the UI in the memory.

The processor may be further configured to, based on an image being provided by the external device through the input/output interface, obtain the information on the location of the UI provided by the external device by training a location at which a UI is displayed from the image provided by the external device, obtain the information on the structure of the UI provided by the external device by training a feature area of a UI included in the image provided by the external device, and store the obtained information on the location and the structure of the UI in the memory.

The processor may be further configured to, obtain information on a location of the UI included in the received image by identifying an area in which a content is displayed and an area in which a UI is displayed from the received image, obtain information on a structure of the UI included in the received image by extracting a feature area of the UI included in the received image, and identify whether the UI provided by the external device is changed by comparing the location and the structure of the UI stored in the memory with the location and the structure of the UI included in the received image.

The processor may be further configured to, based on identification that the UI provided by the external device is changed, identify a logo included in the UI included in the received image, and identify whether a provider who provides a content is changed by using the external device by comparing the logo stored in the memory with the identified logo.

The processor may be further configured to, based on identification that a provider who provides a content is not changed by using the external device, provide a guide message that the UI provided by the external device is changed.

The electronic apparatus may further include a communication interface, and a user operator, wherein the processor is further configured to, based on a user command being input from a remote controller for controlling the electronic apparatus through the communication interface, or through the user interface, request an image to the external device through the input/output interface according to the user command, and based on an image being received from the external device through the input/output interface, identify whether a UI is included in the received image by identifying an area in which a content is displayed and an area in which a UI is displayed from the image.

The processor may be further configured to, receive information on the external device through the input/output interface and store the information in the memory together with the information on the UI provided by the external device, based on the external device being connected again after being disconnected through the input/output interface, receive information on the external device connected again through the input/output interface, and identify whether a provider who provides a content is changed by using an external device by comparing the information on the external device stored in the memory with the information on the external device connected again.

The processor may be further configured to match a function of the retrained UI with a control button of a remote controller for controlling the electronic apparatus and store a result in the memory.

According to an embodiment, there is provided a method for an electronic apparatus, the method including training a UI provided by an external device through an input/output interface and storing information on the UI provided by the external device, based on an image being received from the external device through the input/output interface, identifying whether a UI is included in the received image, based on a UI being included in the received image, identifying whether the UI provided by the external device is changed by comparing the UI included in the received image with the stored UI provided by the external device, and based on identification that the UI provided by the external device is changed, retraining the UI included in the received image, and storing information on the UI included in the received image.

The storing of the information on the UI provided by the external device may include training a location, and a structure of the UI provided by the external device through the input/output interface, and a logo included in the UI, and storing information on the location and the structure of the UI provided by the external device, and information on the logo included in the UI.

The storing of the information on the UI provided by the external device may include, based on an image being provided by the external device through the input/output interface, training a location at which a UI is displayed from the image provided by the external device and obtaining the information on the location of the UI provided by the external device, training a feature area of the UI included in the image provided by the external device and obtaining the information on the structure of the UI provided by the external device, and storing the obtained information on the location and the structure of the UI.

The identifying whether the UI provided by the external device is changed may include obtaining information on a location of the UI included in the received image by identifying an area in which a content is displayed and an area in which a UI is displayed from the received image, obtaining information on a structure of the UI included in the received image by extracting a feature area of the UI included in the received image, and identifying whether the UI provided by the external device is changed by comparing the location and the structure of the UI stored in the memory with the location and the structure of the UI included in the received image.

The method may further include, based on identification that the UI provided by the external device is changed, identifying a logo included in the UI included in the received image, and identifying whether a provider who provides a content is changed by using the external device by comparing the logo stored in the memory with the identified logo.

The method may further include, based on identification that the provider who provides the content is not changed by using the external device, providing a guide message that the UI provided by the external device is changed.

The identifying whether the UI is included in the received image may include, based on a user command being input, requesting an image to the external device through the input/output interface according to the user command, and based on an image being received from the external device through the input/output interface, identifying whether a UI is included in the received image by identifying an area in which a content is displayed and an area in which a UI is displayed.

The method may further include receiving information on the external device through the input/output interface and storing the information together with the information on the UI provided by the external device, based on the external device being connected again after being disconnected through the input/output interface, receiving information on the external device connected again through the input/output interface, and identifying whether a provider who provides a content is changed by using the external device by comparing the information on the external device stored in the memory with the information on the external device connected again.

The method may further include matching a function of the retrained UI with a control button of a remote controller for controlling the electronic apparatus and storing a result in the memory.

According to the above-described various embodiments, an electronic apparatus may identify whether the UI provided by the external device is changed without Internet connection. Accordingly, the electronic apparatus may prevent malfunctions of various functions provided by the external device by recognizing the changed UI.

BRIEF DESCRIPTION OF THE DRAWINGS

FIG. 9 is a flowchart to explain a method for controlling an electronic apparatus according to an embodiment of the disclosure.

DETAILED DESCRIPTION OF EXEMPLARY EMBODIMENTS

Figure 1:
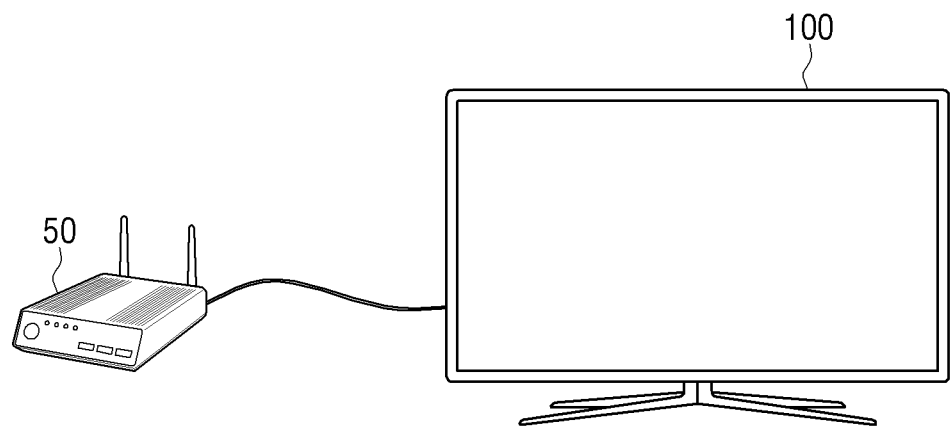
FIG. 1 is a view illustrating an image providing system including an electronic apparatus and an external device according to an embodiment of the disclosure.

Hereinafter, the disclosure will be described in detail with reference to the accompanying drawings.

All the terms used in this specification including technical and scientific terms have the same meanings as would be generally understood by those skilled in the related art. However, these terms may vary depending on the intentions of the person skilled in the art, legal or technical interpretation, and the emergence of new technologies. In addition, some terms are arbitrarily selected by the applicant. These terms may be construed in the meaning defined herein and, unless otherwise specified, may be construed on the basis of the entire contents of this specification and common technical knowledge in the art.

In this specification, terms such as 'include' and 'have/has' should be construed as designating that there are such features, numbers, operations, elements, components or a combination thereof in the specification, not to exclude the existence or possibility of adding one or more of other features, numbers, operations, elements, components or a combination thereof.

In the disclosure, the expressions "A or B," "at least one of A and/or B," "at least one of A and B" or "one or more of A and/or B," and the like include all possible combinations of the listed items.

Terms such as 'first' and 'second' may be used to modify various elements regardless of order and/or importance. Those terms are only used for the purpose of differentiating a component from other components.

When an element (e.g., a first constituent element) is referred to as being "operatively or communicatively coupled to" or "connected to" another element (e.g., a second constituent element), it should be understood that each constituent element is directly connected or indirectly connected via another constituent element (e.g., a third constituent element). However, when an element (e.g., a first constituent element) is referred to as being "directly coupled to" or "directly connected to" another element (e.g., a second constituent element), it should be understood that there is no other constituent element (e.g., a third constituent element) interposed therebetween.

The singular expression also includes the plural meaning as long as it does not differently mean in the context. In this specification, terms such as 'include' and 'have/has' should be construed as designating that there are such features, numbers, operations, elements, components or a combination thereof in the specification, not to exclude the existence or possibility of adding one or more of other features, numbers, operations, elements, components or a combination thereof.

In an embodiment, 'a module', 'a unit', or 'a part' perform at least one function or operation, and may be realized as hardware, such as a processor or integrated circuit, software that is executed by a processor, or a combination thereof. In addition, a plurality of 'modules', a plurality of 'units', or a plurality of 'parts' may be integrated into at least one module or chip and may be realized as at least one processor except for 'modules', 'units' or 'parts' that should be realized in a specific hardware.

The electronic apparatus according to various embodiments of the disclosure may be at least one of, for example, a television, a smart phone, a tablet PC, a mobile phone, a video phone, an electronic book reader, a desktop PC, a laptop PC, a netbook computer, a work station, a server, a PDA, a portable multimedia player (PMP), an MP3 player, a medical device, a camera, or a wearable device. In some embodiments, the electronic apparatus may include at least one of, for example, a digital video disk (DVD) player, an audio, a refrigerator, an air conditioner, a vacuum cleaner, an oven, a microwave oven, a washing machine, an air purifier, etc.

The external device according to various embodiments of the disclosure may be a device connected to an electronic apparatus through an input/output interface, such as a set top box, a DVD player, a BD player, a home automation control panel, a security control panel (e.g., Samsung HomeSync™, Apple TV™, or Google TV™), a game console (e.g., Xbox™, PlayStation™), an electronic photo frame, a desktop PC, or a laptop PC.

In this specification, the term 'user' may refer to a person using an electronic apparatus or a device (e.g., an artificial intelligence electronic apparatus) using an electronic apparatus.

FIG. 1 is a view illustrating an image providing system including an electronic apparatus and an external device according to an embodiment of the disclosure. Referring to FIG. 1, an image providing system may include an electronic apparatus 100 and an external device 50. The electronic apparatus 100 and the external device 50 may be connected through an input/output interface (particularly, HDMI).

The external device 50 may provide an image including at least one of a context obtained from a content providing server through Internet, or a UI provided by the external device 50 to the electronic apparatus 100. The electronic apparatus 100 may output an image obtained from the external device 50. The electronic apparatus 100 may obtain an image including at least one of a context and a UI from the external device 500 and output the obtained image.

The electronic apparatus 100 may store information on a UI provided by the external device 50 by training a UI provided by the external device 50. To be specific, when an image is received from the external device 50 after the external device 50 is connected to the electronic apparatus 100, the electronic apparatus 100 may identify a UI from the image received from the external device 50. When an image is received from the external device 50 in response to a user command for controlling the external device 50, the electronic apparatus 100 may identify a UI from the image received from the external device 50. When the UI is identified, the electronic apparatus 100 may obtain information on the location of the UI provided by the external device 50, information on the structure of the UI and logo information included in the UI. The electronic apparatus 100 may store the obtained information on the location of the UI and the information on the structure of the UI and the logo information included in the UI. The structure information of the UI may include information on the type, shape, size and location of the feature area (e.g., UI element) included in the UI and depth information of the UI. The electronic apparatus 100 may control the external device 50 by using a remote controller for controlling the electronic apparatus 100 based on the structure information of the UI. The electronic apparatus 100 may map a control button (e.g., hot key, direction key, etc.) of the remote controller for controlling the electronic apparatus 100 based on the depth information of the UI and the arrangement of the UI elements included in the UI with a specific function of the UI provided by the external device 50.

In addition, when the information on the UI provided by the external device 50 is stored in the electronic apparatus 100, the electronic apparatus 100 may receive an image from the external device 50. The electronic apparatus 100 may identify a UI from the image received from the image, obtain information on the identified UI, compare the obtained information on the UI with information on the stored UI, and identify whether the information on the UI provided by the external device 500 is changed. When an image is received from the external device 50 in response to a user command for controlling the external device 50, the electronic apparatus 100 may identify the UI from the image received from the external device 50. When the UI is identified, the electronic apparatus 100 may obtain the information on the location of the UI provided by the external device 50 and the information on the structure of the UI. The electronic apparatus 100 may compare the obtained information on the location of the UI, the information on the structure of the UI, the information on the location of the pre-stored UI and the information on the structure of the UI to identify whether the UI provided by the external device 50 is changed.

When it is identified that the UI provided by the external device 50 is changed, the electronic apparatus 100 may retrain the UI included in the received image and store the information on the UI included in the received image. To be specific, when it is identified that the UI provided by the external device 50 is changed, the electronic apparatus 100 may identify whether a provider who provides a content is changed by using the external device 50. The electronic apparatus 100 may identify whether the provider is changed by comparing the logo included in the image provided by the external device 40 with the pre-stored logo information. The electronic apparatus 100 may identify whether the provider is changed based on the information on the external device 50 received through the input/output interface.

When it is identified that the provider is not changed, the electronic apparatus 100 may store the information on the UI included in the received image by retraining the UI included in the received image and provide a message guiding that the UI provided by the external device 50 is changed. When it is identified that the provider is changed, the electronic apparatus 100 may store the information on the external device provided by the changed provider and the information on the UI provided by the external device provided from the changed provider, and provide the user with a message for guiding that the providers who provide the content is changed using the external device 50.

When it is identified that the UI provided by the external device 50 is changed, the electronic apparatus 100 may match a function for the retrained UI with a control button of a remote controller for controlling the electronic apparatus 100 and store a result.

Figure 2:
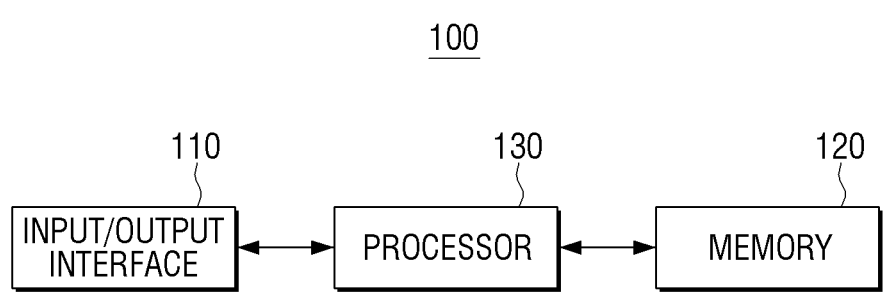
FIGS. 2, 3A and 3B are block diagrams to explain a configuration of an electronic apparatus according to various embodiments of the disclosure.

FIG. 2 is a block diagram to explain a configuration of an electronic apparatus according to various embodiments of the disclosure. Referring to FIG. 2, an electronic apparatus 100 may include an input/output interface 110, a memory 120, and a processor 130.

The input/output interface 110 may input and output at least one of audio signals and image signals. The input/output interface 110 may receive an image including at least one of a content or a UI from the external device 50, and output a control command to the external device 50. In addition, the input/output interface 100 may receive information on the external device 50 (e.g. information on the provider who provides a context using the external device 50, a product name, and a date of manufacturing of the external device 50, information on the software mounted on the external device 50, etc.)

The input/output interface 110 may be an interface of any one of a high-definition multimedia interface (HDMI), a mobile high-definition link (MHL), a universal serial bus (USB), a display port (DP), a thunderbolt, a Video Graphics Array (VGA) port, an RGB port, a D-subminiature (D-SUB), and a digital visual interface (DVI). According to an example embodiment, the input/output interface 110 may include a port for inputting and outputting only audio signals and a port for inputting and outputting only image signals separately, or may be embodied as a single port for inputting and outputting both the audio signals and the image signals.

The memory 120 may store commands or data in relation to at least one constituent element of the electronic apparatus 100. The memory 120 may be implemented as an internal memory such as a ROM (for example, electrically erasable programmable read-only memory (EEPROM)), a RAM, or a separate memory from the processor 130. In this case, the memory 120 may be implemented in the form of a memory embedded in the electronic apparatus 100, or a removable memory in the electronic apparatus 100, depending on the purpose of data storage. For example, data for driving the electronic apparatus 100 may be stored in a memory embedded in the electronic apparatus 100, and data for an expansion function of the electronic apparatus 100 may be stored in a memory attachable to or detachable from the electronic apparatus 100. The memory embedded in the electronic apparatus 100 may be embodied with at least one of a volatile memory (e.g., dynamic RAM, (DRAM), or static RAM (SRAM), synchronous dynamic RAM (SDRAM), or the like), a non-volatile memory (e.g., one time programmable ROM (OTPROM), programmable ROM (PROM), erasable and programmable ROM (EPROM), electrically erasable and programmable ROM (EEPROM), mask ROM, flash ROM, flash memory (such as NAND flash or NOR flash), a hard drive, or a solid state drive (SSD). The memory removable from the electronic apparatus 100 may be embodied with a memory card (e.g., a compact flash, a secure digital (SD), a micro secure digital (SD), a mini secure digital (SD), an extreme digital (xD), a multi-media card (MMC), or the like), an external memory connectable to a USB port (e.g., a USB memory), or the like.

Figure 4:
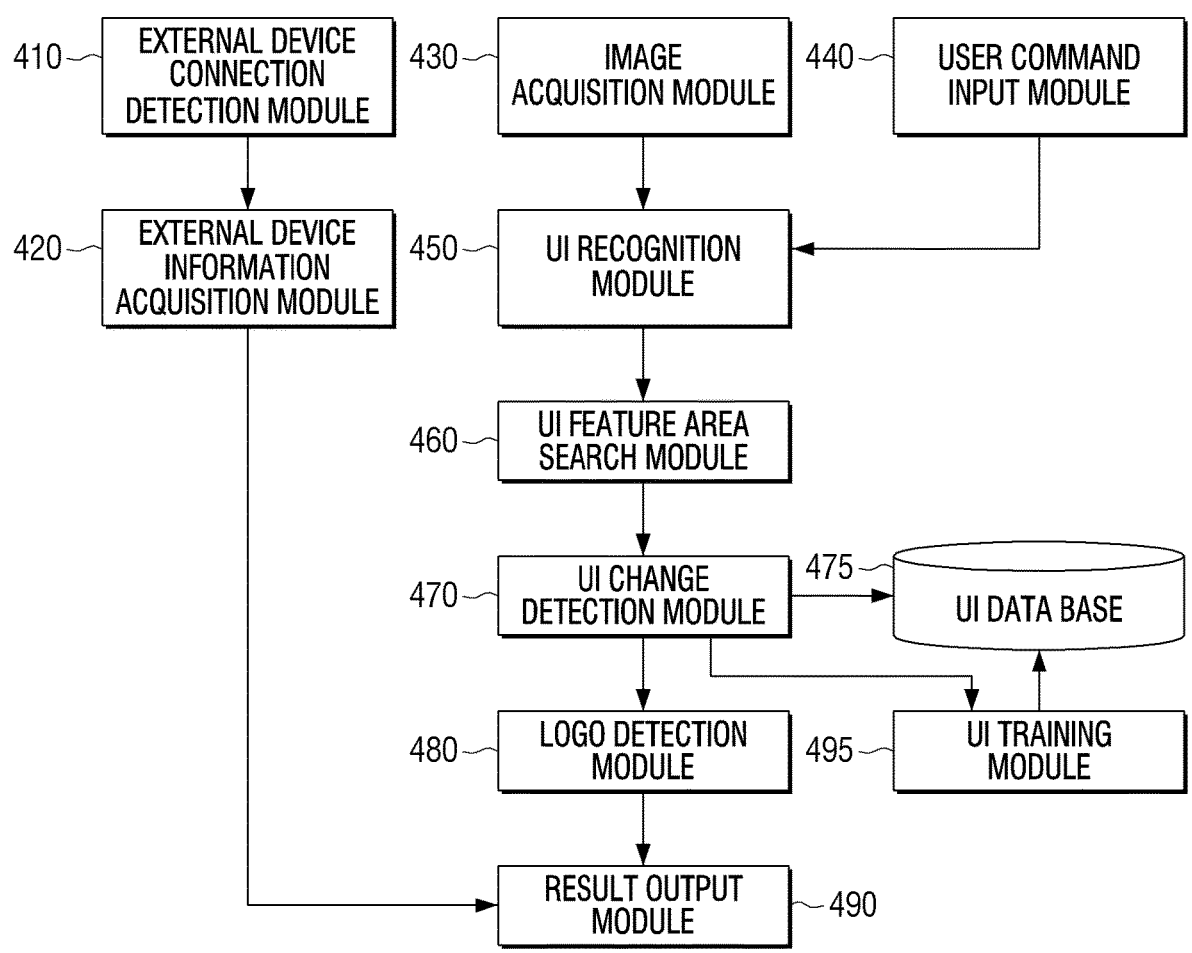
FIG. 4 is a block diagram to explain a configuration for training a UI provided by an external device and for detecting an UI change according to an embodiment of the disclosure.

The memory 120 may train a UI provided by the external device 50, and may include various configurations for sensing whether the UI provided by the external device 50 is changed as shown in FIG. 4. A detailed description thereof will be described below.

The memory 120 may store a trained artificial intelligence model for training the UI provided by the external device 50. The trained artificial intelligence model may be an artificial intelligence model for obtaining information on the location of the UI provided by the external device 50 and information on the structure by recognizing the UI provided by the external device 50. The artificial intelligence model may be embodied as, for example, a neural network model or a deep learning model developed from the neural network model. In the deep learning model, a plurality of network nodes may be located at different depths (or layers) and may exchange data according to a convolution connection relationship. Examples of the trained first artificial intelligence model include Deep Neural Network (DNN), Recurrent Neural Network (RNN), and Bidirectional Recurrent Deep Neural Network (BRDNN), but the disclosure is not limited thereto.

The processor 130 may be electrically connected to the memory 120 to control the overlap operation and function of the electronic apparatus 100. The processor 130 may execute at least one command stored in the memory 120, and train the UI provided by the external device 40 through the input/output interface 100 to store the information on the UI provided by the external device 50 in the memory 120. When an image is received from the external device 50 through the input/output interface 110, the processor 130 may identify whether the UI is included in the received image. When the UI is included in the received image, the processor 130 may compare the UI included in the received image with the UI provided by the external device stored in the memory to identify whether the UI provided by the external device is changed. In addition, when it is identified that the UI provided by the external device 50 is changed, the processor 130 may retrain the UI included in the received image and store the information on the UI included in the received image in the memory 120.

The processor 130 may train the location, the structure, and the logo of the UI provided by the external device 50 through the input/output interface 110 and store the information on the location, the structure, and the logo of the UI provided by the external device 50 in the memory 120.

When the external device 50 provides an image through the input/output interface 110, the processor 130 may obtain the information on the location of the UI provided by the external device 50 by training the location of the UI from the image provided by the external device 50, obtain the information on the structure of the UI provided by the external device 50 by training the feature area of the UI included in the image provided by the external device, and store the obtained information on the location of the UI and the information on the structure of the UI in the memory 120. The processor 130 may obtain the information on the location of the UI, the structure of the UI and the logo included in the UI provided by the external device 50 through image analysis. However, the disclosure is not limited thereto. The processor 130 may obtain the information on the location of the UI, the structure of the UI and the logo included in the UI by inputting the received image into the trained artificial intelligence model.

When a user command is input, the processor 130 may request an image from the external device 50 through the input/output interface 110 according to a user command. When an image is received from the external device 50 through the input/output interface 110, the processor 130 may identify an area in which a content is displayed and an area in which a UI is displayed from an image to identify whether the UI is included in the received image. The user command may be received from an external remote controller through the communication interface 140. However, the disclosure is not limited thereto. The user command may be input through the user operator 180 or the microphone 170 included in the electronic apparatus 100 such as in FIG. 3A or 3B.

When the UI is included in the received image, the processor 130 may obtain information on the UI included in the received image. The processor 130 may obtain the information on the location of the UI included in the received image by identifying the area in which the content is displayed and the area in which the UI is displayed from the received image, extract the feature area of the UI included in the received image to obtain the information on the structure of the UI included in the received image. The processor 130 may obtain the information on the UI (e.g., the information on the location and structure of the UI) by inputting the received image to the trained artificial intelligence model.

The processor 130 may compare the location and the structure of the UI stored in the memory 120 with the location and the structure of the UI included in the received image to identify whether the UI provided by the external device 50 is changed.

When it is identified that the UI provided by the external device 50 is changed, the processor 130 may retrain the changed UI and the store the information on the changed UI in the memory 120. The processor 130 may match a function for the retrained UI with a control button of a remote controller for controlling the electronic apparatus 100 and store a result in the memory 120.

When it is identified that the UI provided by the external device 50 is changed, the processor 130 may identify the logo included in the UI included in the received image, compare the logo stored in the memory 110 with the identified logo to identify whether the providers who provides the content is changed by using the external device 50. The processor 130 may receive information on the external device 50 through the input/output interface 110 and store the information in the memory 110 together with the information on the UI provided by the external device 50, and after the connection of the external device is released and the external device 50 is connected again through the input/output interface 110, the processor 130 may receive information on the external device which is connected again through the input/output interface 110, and compare the information on the external device 50 stored in the memory 120 with the information on the external device connected again to identify whether the providers who provides the content is changed by using the external device.

When it is identified that the provider who provides the content is not changed by using the external device 50, the processor 130 may provide a message guiding that the UI provided by the external device 50 is changed.

Figure 3A:
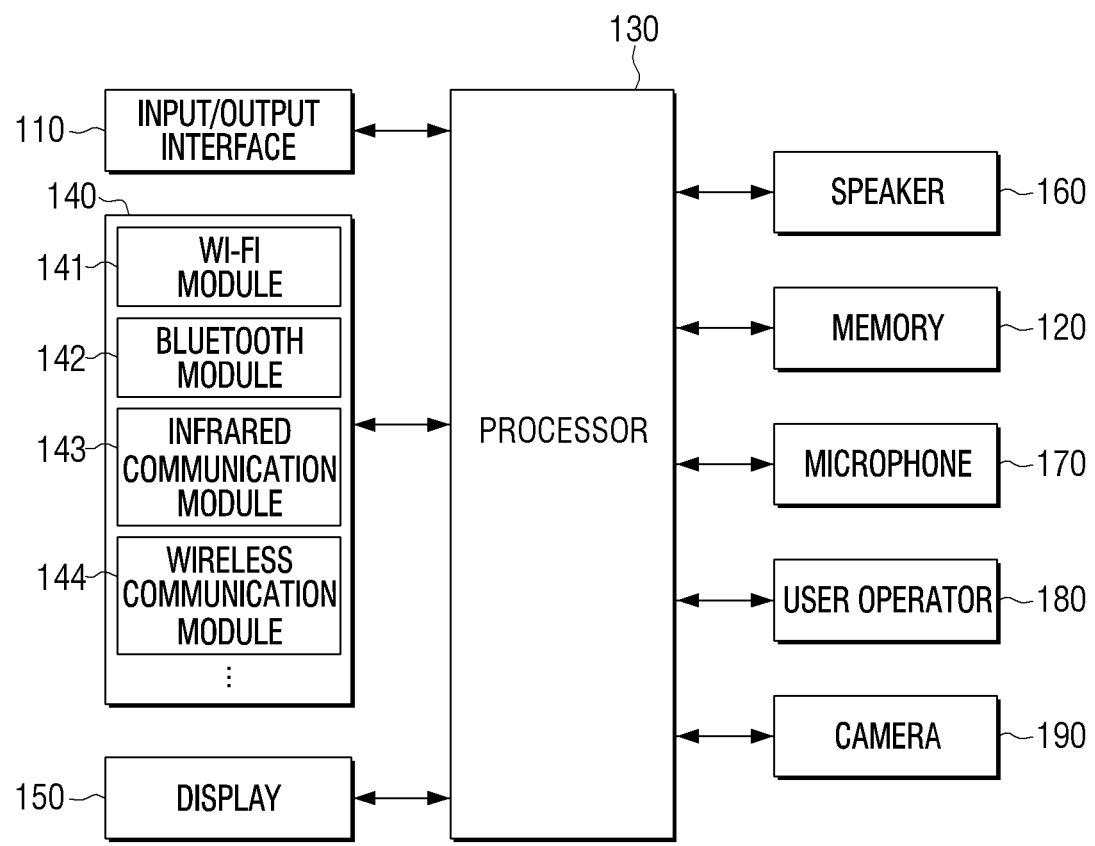

FIG. 3A is a block diagram to explain a configuration of an electronic apparatus according to an embodiment of the disclosure. Referring to FIG. 3A, an electronic apparatus 100 may be embodied as a display device such as a TV. The electronic apparatus 100 may include an input/output interface 110, a communication interface 140, a display 150, a speaker 160, a memory 120, a microphone 170, a user operator 180, a camera, and a processor 130. The interface 110, the memory 120 and the processor 130 as shown in FIG. 3A have been described in FIG. 2. Therefore, a repeated description will be omitted.

The communication interface 140 may perform communication with external devices in various types according to communication methods of various types. The communication interface 140 may include a Wi-Fi module 141, a BLUETOOTH module 142, an infrared communication module 143, a wireless communication module 144, etc. The processor 130 may perform communication with various external devices using the communication interface 140. The external device may include a display device such as a TV, an image processing device such as a set-top box, an external server, a control device such as a remote controller, an sound output device such as a BLUETOOTH speaker, a lighting device, a smart cleaner, home appliances such as a smart refrigerator, an IOT home manager, etc.

The Wi-Fi module 141 or the BLUETOOTH module 142 may perform communication using a Wi-Fi method, and a BLUETOOTH method, respectively. When the Wi-Fi module 141 or the BLUETOOTH module 142 is used, various connectivity information such as an SSID and a session key may be transmitted and received first, communication connection may be established based on the connectivity information, and various information may be transmitted and received based thereon.

The infrared communication module 143 may perform communication according to an infrared data association (IrDA) technology for transmitting data wirelessly at a short distance using an infrared ray between a time ray and a millimeter wave.

The wireless communication module 144 may include at least one communication chip for forming communication according to various communication standards such as IEEE, ZigBee, 3rd Generation (3G), 3rd Generation Partnership Project (3GPP), Long Term Evolution (LTE), $4^{th}$ Generation (4G), $5^{th}$ Generation (5G), or the like.

In addition, the communication interface 140 may include at least one wired communication module that performs communication by using a Local Area Network (LAN) module, an Ethernet module, a pair cable, a coaxial cable, or an optical fiber cable.

According to an embodiment, the communication interface 140 may use the same communication module (e.g., a Wi-Fi module) to perform communication with an external device such as a remote controller and an external sever.

According to another embodiment, the communication interface 140 may use a different communication module (e.g., a Wi-Fi module) for performing communication with an external device such as a remote controller and an external server. For example, the communication interface 140 may use at least one of Ethernet module or Wi-Fi module for performing communication with an external server, or use a BT module for performing communication with an external device such as a remote controller. However, the disclosure is not limited thereto. The communication interface 140 may use at least one communication module among various communication modules when performing communication with a plurality of external devices or an external server.

The display 150 may display an image received from the external device 50 through the input/output interface 110. The image received from the external device 50 may include at least one of a content obtained from a content provider and a UI provided by the external device 50. When the UI provided by the external device 50 is changed, the display 150 may provide a message guiding that the UI is changed.

The display 150 may be implemented as various types of displays such as a Liquid Crystal Display (LCD), an Organic Light Emitting Diodes (OLED) display, a Plasma Display Panel (PDP), and the like. The display 150 may also include a driving circuit, a backlight unit, etc., which may be implemented in the form of an a-si TFT, a low temperature poly silicon (LTPS) TFT, an organic TFT (OTFT), etc. Meanwhile, the display 150 may be implemented as a touch screen in combination with a touch sensor, a flexible display, a three dimensional display (3D display), etc.

According to an embodiment, the display 150 may include a bezel housing a display panel as well as a display panel for outputting an image. The bezel according to an embodiment may include a touch sensor (not shown) for sensing a user interaction.

The speaker 160 may be a constituent elements for outputting various alarming sounds or voice messages as well as various audio data received from the external device 50 through the input/output interface 110. The electronic apparatus 100 may include an audio outputting device such as the speaker 160, but may include an output device such as an audio output terminal.

The microphone 170 may be configured to receive a user voice in an activated state. For example, the microphone 170 may be integrally embodied on the upper side, the front side, and the side surface direction of the electronic apparatus 100. The microphone 170 may have various constituent elements such as a microphone for collecting user voices in the analog format, an amplification circuit for amplifying the collected user voices, an A/D conversion circuit for sampling the amplified user voice and converting the user voice into a digital signal, a filter circuit for removing noise components from the digital signal, etc.

The user operator 180 may be configured to receive a user command for controlling the electronic apparatus 100. The user operator 180 may be implemented as a device such as a button, a touch pad, a mouse, or a keyboard, capable of performing the above-described display function and operation input function. The button may be various types of buttons such as a mechanical button, a touch pad, a whirl, etc. provided in a random area such as a front surface unit, a side surface unit, and a rear surface unit of the outside of the body of the electronic apparatus 100.

The camera 190 may be configured to capture the outside of the electronic apparatus 100, and provided in one area of the electronic apparatus 100. However, the disclosure is not limited thereto, but the camera 190 may be electrically connected to the electronic apparatus 100.

Figure 3B:
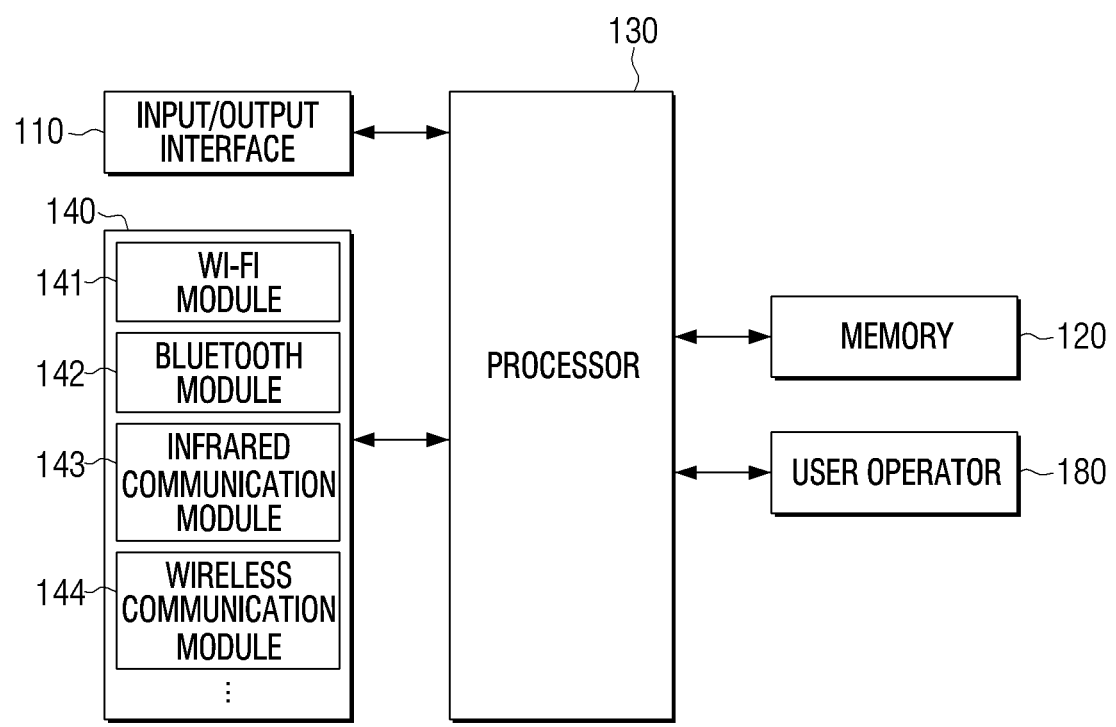

FIG. 3B is a view illustrating a configuration of an electronic apparatus 100 according to another embodiment of the disclosure. Referring to FIG. 3B, an electronic apparatus 100 may include an input/output interface 110, a memory 120, a communication interface 140, a user operator 180, and a processor 130. The electronic apparatus shown in FIG. 3B may not include the display 150 unlike that in FIG. 3A, and examples of the electronic apparatus 100 may include a set-top box, a desk top PC, etc. The input/output interface 110, the memory 120, the communication interface 140, the user operator 180, and the processor 130 shown in FIG. 3B have been described in detail in FIG. 2 and FIG. 3A. Therefore, a repeated description will be omitted.

FIG. 4 is a block diagram to explain a configuration for training a UI provided by an external device and for detecting an UI change according to an embodiment of the disclosure. Referring to FIG. 4, an electronic apparatus 100 may include an external device connection detection module 410, an external device information acquisition module 420, an image acquisition module 430, a user command input module 440, a UI recognition module 450, a UI feature area search module 460, a UI change detection module 470, a UI database 475, a logo detection module 480, a result output module 490, and a UI training module 495. The modules shown in FIG. 4 may be implemented in software stored in the memory 120, but this is merely exemplary, and may be implemented through the combination of at least one hardware and software.

The external device connection detection module 410 may identify a connection state with an external device by detecting whether the external device is connected through the input/output interface 110.

The external device information acquisition module 420 may acquire information on the external device from the external device 50 connected through the input/output interface 110. The information on the external device 50 may include information on the external device product name, the date of manufacturing, information on the software mounted in the external device, information on the provider who provides the content using the external device.

The image acquisition module 430 may acquire the image provided by the external device 50 through the input/output interface 110. The image provided by the external device 50 may receive at least one of the content provided by the content provider and the UI provided by the external device 50.

The user command input module 440 may receive a user command received through various input devices (e.g., the user operator 180, the microphone 170 or an external remote controller). The user command input module 440 may identify the input user command and request an image to the external device 50. Particularly, in order to prevent an unnecessary UI recognition operation, the user command input module 440, when the user command is input through the external remote controller, may request the UI recognition module 450 to recognize the UI in the image received from the external device 50.

The user command input module 440 may recognize the user voice through the microphone of the remote controller or the microphone 170 in the electronic apparatus 100. When receiving voices through the microphone included in the remote controller, the user command input module 440 may receive analog voice signals digitalized by the remote controller through a communication module such as BLU-ETOOTH, and when receiving voices through the microphone provided in the electronic apparatus 100, may digitize the analog voice signals. The user command input module 440 may transmit the digitalized voice signal to an external server and obtain the text corresponding to the voice signal, and convert the signal into the text through STT algorithms stored in the electronic apparatus 100. The user command input module 4400 may obtain the user command corresponding to the text obtained through a natural language comprehension module. The user command input module 440 may receive a user command corresponding to the user voice signal by the external server and obtain the user command.

The UI recognition module 450 may recognize the UI by identifying the area on which the content is displayed and the area on which the UI is displayed from the image obtained through the image acquisition module 430. When a user command obtained from the user command input module 440 (particularly, a user command for displaying the UI) is input, the UI recognition module 450 may recognize the UI from the image obtained through the image acquisition module 430.

According to an embodiment, the UI recognition module 450 may identify the area on which the UI is displayed using a corner edge extraction method, and obtain the location information of the UI based on the area on which the UI is displayed. According to another embodiment, the UI recognition module 450 may obtain the location information of the UI by detecting the area on which the UI is displayed through the trained artificial intelligence model.

When it is identified that the UI is included in the input image, the UI recognition module 450 may repeatedly receive an image, and identify the area being continuously changed as the area on which the content is displayed, and identify the area not being changed in the image as the area on which the UI is displayed.

The UI feature area search module 460 may search the feature area of the UI obtained through the UI recognition module 450. The UI feature area search module 460 may search the feature area having its own pattern in the area on which the UI is displayed through logo or text information. The UI feature area search module 460 may obtain information on the shape, location and size of the UI element included in the UI based on the logo or text information. The UI feature area search module 460 may obtain information on the shape, location, and size of the UI element included in the UI for each depth of the UI being displayed. When the UI being displayed is UI in the top level depth, the UI feature area search module 460 may obtain information on the shape, location, and size of the UI element corresponding to the UI in the top level depth, and when the UI being displayed is a UI in the sub-depth, the UI feature area search module 460 may obtain information on the shape, location, and size of the UI element corresponding to the UI in the sub-depth. The depth information of the UI being displayed may be identified based on the type of the image being displayed and the type of the user command. For example, when the previous image is an image content, and the hotkey of a remote controller is selected, the UI feature area search module 460 may identify that the UI being displayed is the top level depth.

The UI change detection module 470 may detect whether the UI provided by the external device 50 is changed by comparing the information on the UI obtained through the UI recognition module 450 and the UI feature area search module 460 with information on the UI stored in a UI data base 475. The UI change detection module 470 may identify the similarity by comparing the information on the location of the UI obtained through the UI recognition module 450, the information on the structure of the UI obtained through the UI feature area search module 460, and the information on the location and structure of the UI stored in the UI data base 475. The identified similarity value may be output in the range between 0 and 1, and if it is identified that the similarity is equal to or more than a predetermined value (e.g., 0.9), the UI change detection module 470 may identify that the UI provided by the external device 50 is not changed, and if it is identified that the similarity value is less than a predetermined value, the UI change detection module 470 may identify that the UI provided by the external device 50 is changed.

The UI data base 475 may store information on the pre-trained UI. The UI database 475 may store information on the location and structure of the pre-trained UI, information on the logo included in the UI, etc.

When it is identified that the UI is changed, the logo detection module 480 may detect the logo in the UI. The logo detection module 480 may identify the similarity by comparing the logo stored in the UI database 475 with the detected log, and identify whether the provider who provides the content is changed by using the external device based on the similarity. However, when the logo is updated even if the external device is provided by the same provider, the stored logo may be different from the sensed logo. Therefore, the logo detection module 480 may identify whether the provider is changed based on the text included in the UI (particularly, text related to the provider name) as well as the logo.

When it is identified that the provider is changed through the logo detection module 480, the result output module 490 may output a message that guides that the provider is changed, and when it is identified that the provider is not changed through the logo detection module 480, the result output module 490 may output a message guiding that the UI provided by the external device 50 is updated. The result output module 490 may transmit the result on whether the UI is changed and whether the provider is changed to the external server through the communication interface 140.

The result output module 490 may identify whether the provider is changed based on information on the external device obtained through the external device information acquisition module 420 and output the identification result. When the external device 50 is detached and then attached, the external device information acquisition module 420 may obtain information on the external device from the attached external device, compare the information on the external device obtained through the external device information acquisition module 420 with the information on the pre-stored external device, and identify whether the provider is changed.

The UI training module 495 may train the UI based on whether the UI sensed through the UI change detection module 470 is changed. When it is identified that the UI is not changed, the UI training module 495 may store information on the pre-stored UI in the UI database 475. The UI training module 495 may perform an additional UI training operation for obtaining more accurate information on the UI. When it is identified that the UI is changed, the UI training module 495 may retrain the changed UI and obtain information on the changed UI, and store the obtained information on the UI in the UI database 475.

The constituent elements shown in FIG. 4 are merely exemplary, but constituent elements not shown in FIG. 4 may be further added, or part of the constituent elements shown in FIG. 4 will be omitted or changed.

Figure 5:
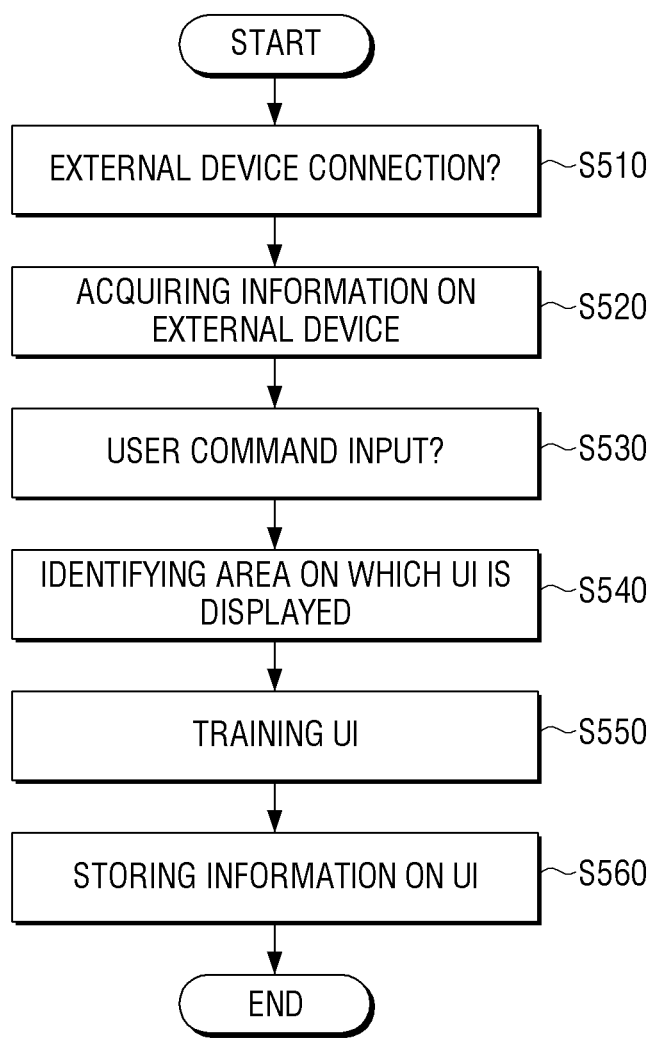
FIGS. 5, 6A, 6B and 6C are views to explain a method for training a UI provided by an external device according to an embodiment of the disclosure.
Figure 6A:
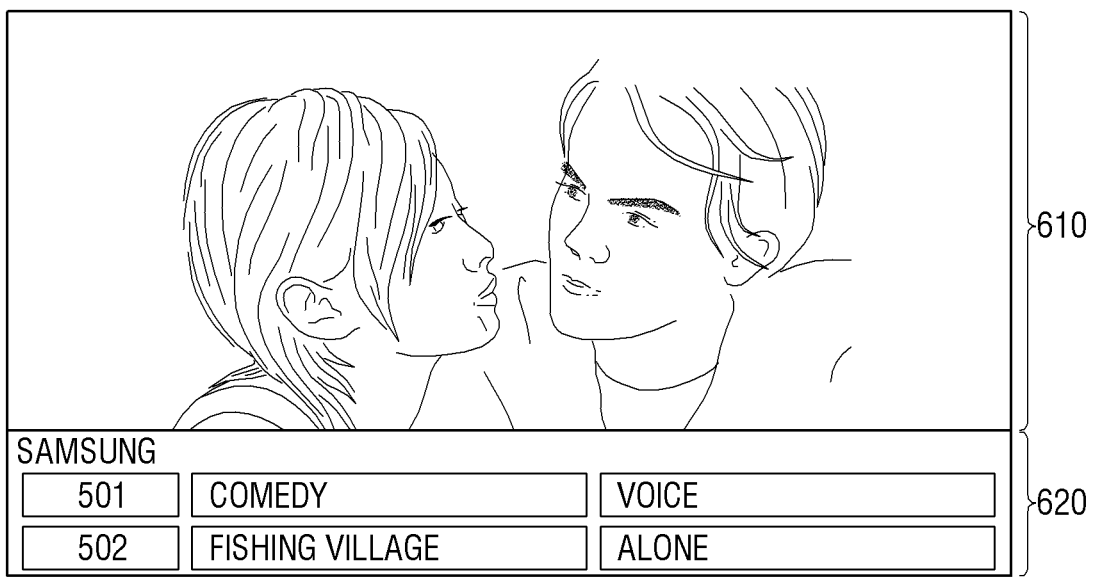
Figure 6B:
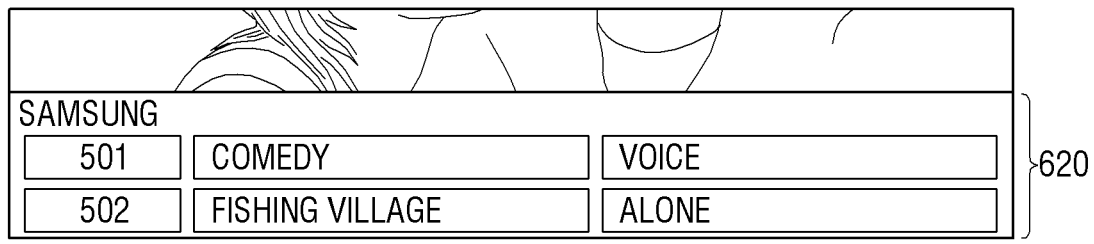
Figure 6C:
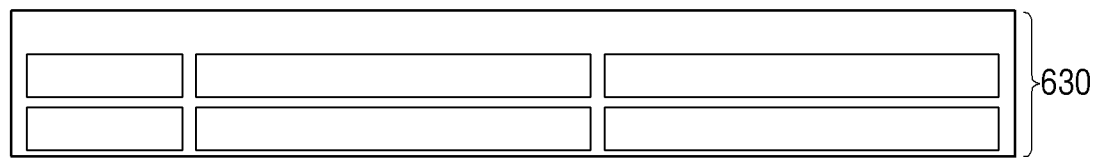

FIG. 5 to FIG. 6C are views to explain a method for training a UI provided by an external device according to an embodiment of the disclosure.

An electronic apparatus 100 may identify whether an external device 50 is connected at step S510. The electronic apparatus 10 may be connected to the external device 50 through the input/output interface 110.

The electronic apparatus 100 may obtain information on the external device 50 at step S520. The information on the external device 50 may include information on the external device product name, the manufacturing company, the manufacturing date, the information on the software stored in the external device 50, and the information on the providers that provides a content using the external device 50.

The electronic apparatus 100 may receive a user command at step S530. The electronic apparatus 100 may receive a user command for receiving a UI from the external device 50. For example, referring to FIG. 6A, the electronic apparatus 100 may receive a user command for requesting an image including the content and the UI.

The electronic apparatus 100 may identify the image in which the UI is displayed from the obtained image at step S540. The electronic apparatus 100 may sense the image in which the UI is displayed using a corner edge extraction method. When the image in which the UI is displayed is sensed, the electronic apparatus 100 may repeatedly receive an image and identify an area continuously changed as the area in which the content is displayed, and an area not to be changed as the area in which the UI is displayed. Referring to FIG. 6A, the electronic apparatus 100 may identify an area 610 in which the content at the top is displayed and an area 620 in which the UI at the bottom is displayed from the image provided by the external device 50. The electronic apparatus 100 may obtain the information on the location of the UI based on the information on the area 620 in which the UI is displayed.

The electronic apparatus 100 may train a UI at step S550. That is, the electronic apparatus 100 may provide the UI to the trained artificial intelligence model to obtain information on the UI. Referring to FIG. 6B, the electronic apparatus 100 may obtain the information on the type, shape, size and location of the feature area (particularly, a UI element) included in the UI based on the UI 620. Referring to FIG. 6C, the electronic apparatus 100 may obtain the information on the type, shape, size and location of an UI element 630 from which text, icons, included in the UI element are removed. By analyzing the feature area included in the UI, the electronic apparatus 100 may obtain the information on the structure of the UI. The electronic apparatus 100 may obtain the information on the UI by using the trained artificial intelligence model.

The electronic apparatus 100 may store information on the UI at step S560. The electronic apparatus 100 may store the information on the location of the UI and the information on the structure of the UI.

By repeating the steps from S530 to S550, the electronic apparatus 100 may obtain information on the UI by training the UI provided by the external device 50 more accurately.

Figure 7:
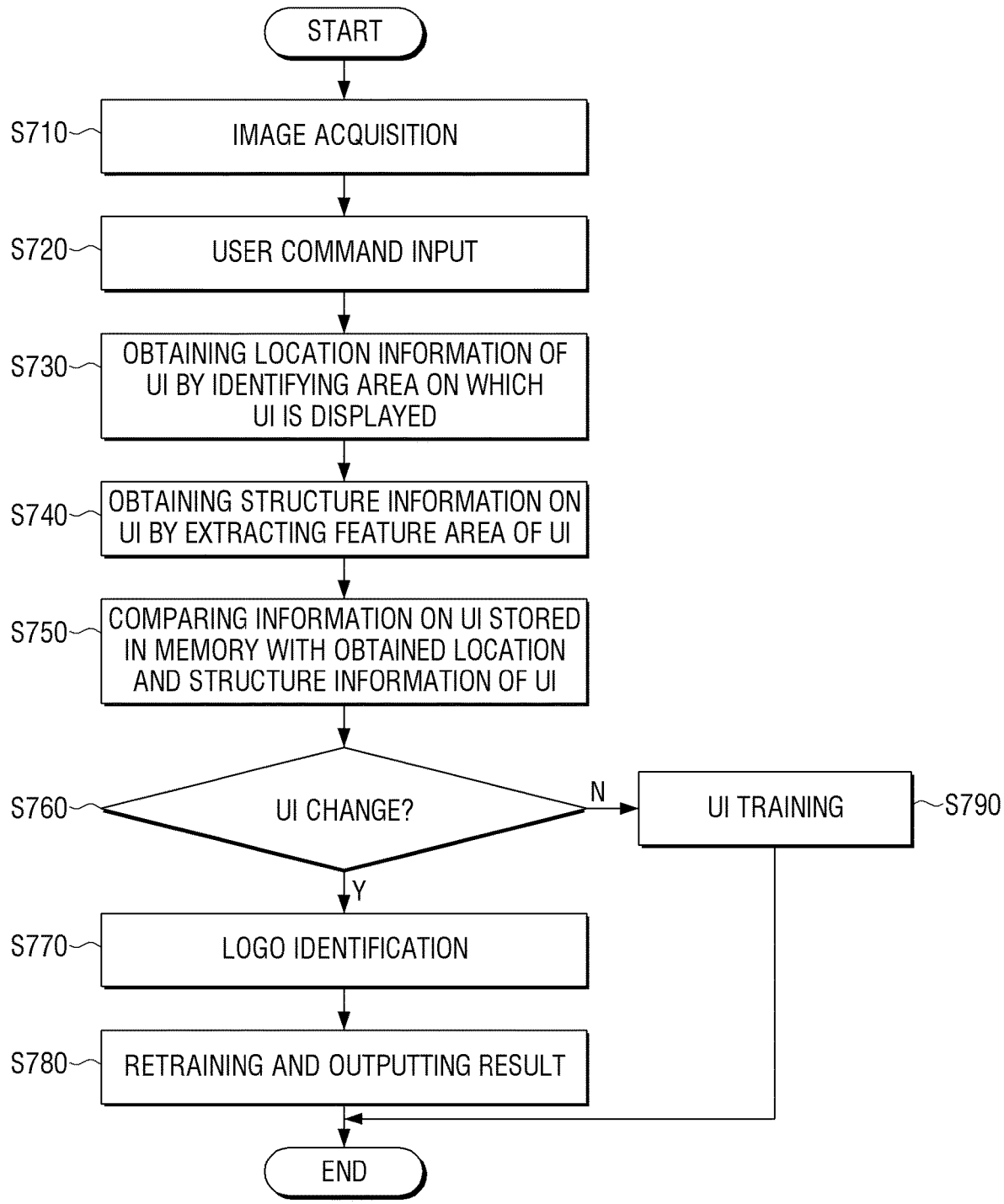
FIGS. 7, 8A, 8B and 8C are views to explain a method for detecting an UI change provided by an external device according to an embodiment of the disclosure.

FIG. 7 is a flowchart to explain a method for detecting an UI change provided by an external device according to an embodiment of the disclosure; and The electronic apparatus 100 may obtain an image at step S710. The content provided by the external device 50 may be included in the image.

The electronic apparatus 100 may receive a user command at step S720. The user command may be a user command received from an external remote controller for displaying the UI. The user command may be a user command for selecting a button provided in the electronic apparatus 100, or a voice command received through a microphone, or a voice command received through the microphone included in the remote controller.

The electronic apparatus 100 may obtain location information of the UI by identifying the area on which the UI is displayed at step S730. To be specific, the electronic apparatus 100 may obtain the location information of the UI by identifying the area on which the content is displayed and the area on which the UI is displayed from the image provided by the external device 50. The electronic apparatus, referring to FIG. 8A, may identify an area 810 in which the content on the left is displayed and an area 820 in which the UI on the right is displayed from the image provided by the external device 50.

Figure 8A:
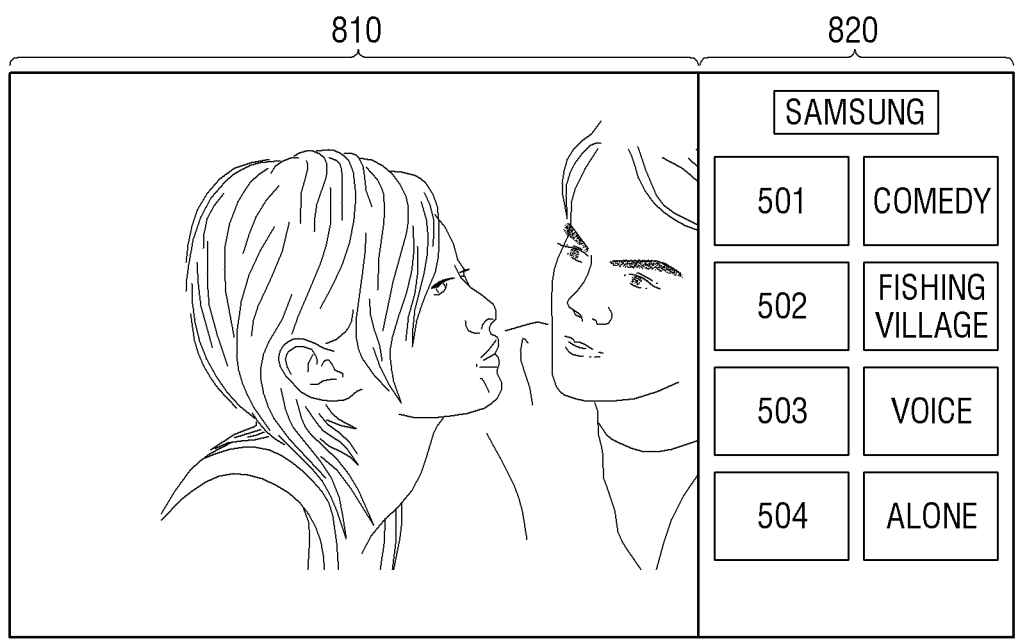
Figure 8B:
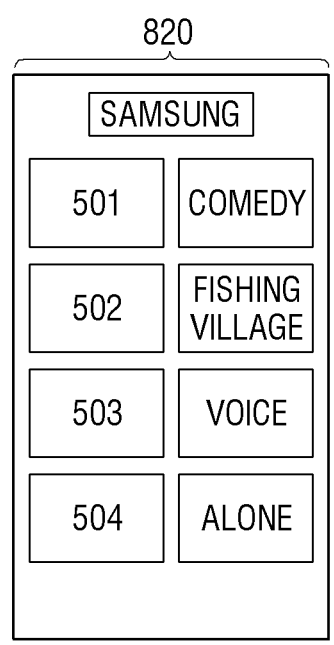
Figure 8C:
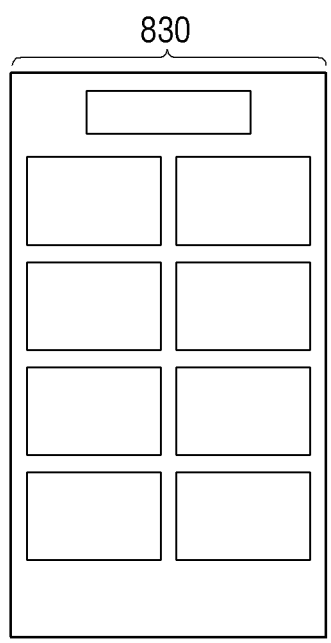

The electronic apparatus 100 may obtain the structure information on the UI by extracting the feature area of the UI at step S740. Referring to FIG. 8B, the electronic apparatus may obtain information on the type, shape, size and location of the feature area included in the UI (particularly, the UI element) based on the identified UI 820. Referring to FIG. 8c, the information on the type, shape, size and location of the UI element 830 from which the text, icon, etc. included in the UI element are removed. The electronic apparatus 100 may obtain information on the structure of the UI by using the trained artificial intelligence model.

The electronic apparatus 100 may compare information on the UI stored in the memory 120 with the obtained location and structure information of the UI at step S750. The electronic apparatus 100 may obtain a similarity value by comparing the location and structure information on the pre-trained UI with the location and structure information obtained at steps S730 and S740.

The electronic apparatus 100 may identify whether the UI has been changed based on the comparison result at step S760. The electronic apparatus 100 may identify whether the similarity value is equal to or more than a predetermined value and identify whether the UI has been changed.

If it is identified that the UI is changed at step S760-Y, the electronic apparatus 100 may confirm the logo included in the UI at step S770. For example, referring to FIG. 6A, if it is identified that the pre-stored UI 620 is changed to the newly sensed UI 820 as shown in FIG. 8A, the electronic apparatus 100 may identify whether the logo included in the UI is changed. In other words, the electronic apparatus 100 may identify whether a provider who provides a content is changed by using the external device 50.

The electronic apparatus 100 may retrain the changed UI and output the result at step S780. That is, the electronic apparatus 100 may provide the changed UI to the trained artificial intelligence model to obtain information on the changed UI. The electronic apparatus 100 may retrain the changed UI and store information on the changed UI (e.g., information on the location and structure of the UI). If it is identified that the provider is changed, the electronic apparatus 100 may output a message that guides that the provider is changed, and if it is identified that the provider is not changed, the electronic apparatus 100 may output a message that guides that the UI provided by the external device 50 is updated.

If it is identified that the UI is not changed at step S760, the electronic apparatus 100 may train the UI at step S790. The electronic apparatus 100 may obtain and store more accurate information on the UI by reinforcement training with respect to the UI not being changed.

FIG. 9 is a flowchart to explain a method for controlling an electronic apparatus according to an embodiment of the disclosure.

The electronic apparatus 100 may train the UI provided by the external device 50 and store information on the UI provided by the external device at step S910. The electronic apparatus 100 may train the location on which the UI is displayed from the image provided by the external device 50 and obtain the information on the location of the UI provided by the external device 50. The electronic apparatus 100 may train the feature area of the UI included in the image provided by the external device 50, obtain the information on the structure of the UI provided y the external device 50, and store obtained information on the location of the UI and the structure on the UI in the memory 120. The electronic apparatus 100 may train the logo included in the UI other than the location and the structure information on the UI and store the logo and the information in the memory 120.

The electronic apparatus 100 may receive an image from the external device 50 at step S920. At least one of the content and the UI provided by the content provider may be included in the image.

The electronic apparatus 100 may identify whether the UI is included in the received image at step S930. When a user command for controlling the external device 50 is input, the electronic apparatus 100 may request an image from the external device 50 through the input/output interface 110 according to a user command, and when the image is received from the external device 50 through the input/output interface 110, the electronic apparatus 100 may identify the area on which the content is displayed and the area on which the UI is displayed from the image and identify whether the UI is included in the received image.

The electronic apparatus 100 may compare the UI included in the image with the UI included in the memory at step S940. The electronic apparatus 100 may obtain the information on the location of the UI included in the received image by identifying the area on which the content is displayed and the area on which the UI is displayed from the received image, obtain the information on the structure of the UI included in the received image by extracting the feature area of the UI included in the received image, and compare the location and structure of the UI stored in the memory 120 with the location and structure of the UI included in the received image.

The electronic apparatus 100 may identify whether the UI provided by the external device is changed at step S950. The electronic apparatus 100 may identify whether the UI is changed based on the result of comparing the location and structure of the UI stored in the memory 120 with the location and structure of the UI included in the received image.

If it is identified that the UI is changed at step S950-Y, the electronic apparatus 100 may store the information on the UI included in the received image in the memory 120 by retraining the UI included in the received image at step S960. The electronic apparatus 100 may identify whether the content provides is changed by using the external device 50 based on whether the logo included in the UI is changed.

The methods according to various example embodiments of the disclosure may be embodied in the form of application that can be installed on a conventional electronic apparatus.

The methods according to various example embodiments of the disclosure may be embodied as software upgrade or hardware upgrade with respect to a conventional electronic apparatus.

In addition, various example embodiments of the disclosure can be performed through an embedded server, or an external server of at least one of an electronic apparatus or a display device.

Various embodiment of the present disclosure may be embodied as software including commands stored in machine-readable storage media that can be read by a machine (e.g., a computer). The machine may be an apparatus that calls a command stored in a storage medium and is operable according to the called command, including an electronic apparatus in accordance with the disclosed example embodiments (e.g., an electronic apparatus (A)). When the command is executed by a processor, the processor may perform the function corresponding to the command, either directly or under the control of the processor, using other components. The command may include code generated or executed by a compiler or an interpreter. The machine-readable storage medium may be provided in the form of a non-transitory storage medium. The term "non-transitory" means that the storage medium does not include a signal but is tangible, but does not distinguish whether data is stored semi-permanently or temporarily on a storage medium.

According to an embodiment, the method according to various embodiments disclosed herein may be provided in a computer program product. A computer program product may be traded between a seller and a purchaser as a commodity. A computer program product may be distributed in the form of a machine-readable storage medium (e.g., compact disc read only memory (CD-ROM)) or distributed online through an application store (e.g., PlayStore™). In the case of online distribution, at least a portion of the computer program product may be temporarily stored, or temporarily created, on a storage medium such as a manufacturer's server, a server of an application store, or a memory of a relay server.

Each of the components (e.g., modules or programs) according to various embodiments may consist of a single entity or a plurality of entities, and some subcomponents of the abovementioned subcomponents may be omitted, or other components may be further included in various embodiments. Alternatively or additionally, some components (e.g., modules or programs) may be integrated into one entity to perform the same or similar functions performed by each component prior to integration. Operations performed by modules, programs, or other components, in accordance with various embodiments, may be executed sequentially, in parallel, repetitively, or heuristically, or at least some operations may be performed in a different order, or omitted, or another function may be further added.

Although embodiments have been shown and described, it will be appreciated by those skilled in the art that changes may be made to these embodiments without departing from the principles and spirit of the disclosure. Accordingly, the scope of the invention is not construed as being limited to the described embodiments, but is defined by the appended claims as well as equivalents thereto.

What is claimed is:

1. An electronic apparatus, comprising:
   at least one memory configured to store at least one instruction; and
   at least one processor configured to execute the at least one instruction to perform a process including:
   receiving, from an external device, data corresponding to a user interface (UI) for controlling the external device,
   providing the received data to a trained model to obtain, from the received data, information on structure and location of a UI element in the UI,
   based on an image being received by the electronic apparatus from the external device:
      identifying whether a UI is included in the received image,
      based on identifying that a UI is included in the received image:
         comparing information on structure and location of a UI element in the UI included in the received image with the information on the structure and the location of the UI element in the UI obtained from the received data,
         identifying, based on the compared information, a similarity value between the information on the structure and the location of the UI element in the UI included in the received image and the information on the structure and the location of the UI element in the UI obtained from the received data,
         identifying, based on the identified similarity value being equal to or more than a predetermined value, that there is not a change from the UI to which the received data corresponds to the UI included in the received image,
         identifying, based on the identified similarity value being less than the predetermined value, that there is a change from the UI to which the received data corresponds to the UI included in the received image, and
      based on identifying that there is a change from the UI to which the received data corresponds to the UI included in the received image:
         retraining the trained model for obtaining the information on the structure and the location of the UI element in the UI obtained from the received data,
         storing the information on the structure and the location of the UI element in the UI obtained from the received data in the at least one memory,
         matching a function of the UI included in the received image with a control button of a remote controller for controlling the electronic apparatus, and
         storing a result of the matching in the at least one memory.

2. The electronic apparatus as claimed in claim 1, wherein the providing the received data to the trained model provides the received data to the trained model to obtain information on a logo included in the UI to which the received data corresponds, and
the process further includes, based on identifying that the UI is included in the received image, comparing information on a logo included in the UI included in the received image and the information on the logo included in the UI to which the received data corresponds.

3. The electronic apparatus as claimed in claim 2, wherein the comparing information on the logo included in the UI included in the received image and the information on the logo included in the UI to which the received data corresponds compares the information on the logo included in the UI included in the received image and the information on the logo included in the UI to which the received data corresponds, to identify whether a provider that provides a content via the external device has changed.

4. The electronic apparatus as claimed in claim 3, wherein the process further comprises, based on identifying that a provider that provides a content via the external device has changed:
   providing a guide message that the provider has changed.

5. The electronic apparatus as claimed in claim 1, wherein the receiving, from the external device, the data corresponding to the UI for controlling the external device includes:
   receiving, from the external device, an image including the UI for controlling the external device, and
   obtaining the UI for controlling the external device from the received image.

6. The electronic apparatus as claimed in claim 1, wherein the process further comprises, based on identifying that a UI is included in the received image:
   obtaining the information on the location of the UI element in the UI included in the received image by identifying an area in the received image in which a content is displayed and an area in the received image in which a UI is displayed, and
   obtaining the information on the structure of the UI element in the UI included in the received image by extracting a feature area of the UI included in the received image.

7. The electronic apparatus as claimed in claim 1, further comprising:
   a communication interface for communicating with the remote controller for controlling the electronic apparatus; and
   a user interface,
   wherein the process further comprises, in accordance with a user command being input from the remote controller through the communication interface, or being input through the user interface:
      providing, to the external device, a request for an image according to the user command, and
      in accordance with an image being received from the external device based on the request, identify whether a UI is included in the image received based on the request, by identifying an area in the image received based on the request in which a content is displayed and an area in the image received based on the request in which a UI is displayed.

8. The electronic apparatus as claimed in claim 1, wherein the process further comprises:
   receiving, from the external device, information on the external device,
   storing the received information on the external device in the at least one memory, and
   after storing the received information on the external device, and after the external device has been connected again to the electronic apparatus after being disconnected from the electronic apparatus:
      receiving information on the external device connected again to the electronic apparatus, and
      identifying whether a provider that provides a content to the electronic apparatus through the external device has changed by comparing the information on the external device stored in the at least one memory with the received information on the external device connected again.

9. The electronic apparatus as claimed in claim 1, wherein the information on the structure of the UI element in the UI to which the received data corresponds includes information on size and shape of the UI element to which the received data corresponds, and the information on the structure of the UI element in the UI included in the received image includes information on size and shape of the UI element in the UI included in the received image.

10. A method comprising, by an electronic apparatus:
receiving, from an external device, data corresponding to a user interface (UI) for controlling the external device;
providing the received data to a trained model to obtain, from the received data, information on structure and location of a UI element in the UI;
based on an image being received by the electronic apparatus from the external device:
  identifying whether a UI is included in the received image,
  based on identifying that a UI is included in the received image:
    comparing information on structure and location of a UI element in the UI included in the received image with the information on the structure and the location of the UI element in the UI obtained from the received data,
    identifying, based on the compared information, a similarity value between the information on the structure and the location of the UI element in the UI included in the received image and the information on the structure and the location of the UI element in the UI obtained from the received data,
    identifying, based on the identified similarity value being equal to or more than a predetermined value, that there is not a change from the UI to which the received data corresponds to the UI included in the received image, and
    identifying, based on the identified similarity value being less than the predetermined value, that there is a change from the UI to which the received data corresponds to the UI included in the received image, and
  based on identifying that there is a change from the UI to which the received data corresponds to the UI included in the received image:
    retraining the trained model for obtaining the information on the structure and the location of the UI element in the UI obtained from the received data,
    storing the information on the structure and the location of the UI element in the UI obtained from the received data in a memory,
    matching a function of the UI included in the received image with a control button of a remote controller for controlling the electronic apparatus, and
    storing a result of the matching in the memory.

11. The method as claimed in claim 10, wherein
the providing the received data to a trained model provides the received data to the trained model to obtain information on a logo included in the UI to which the received data corresponds, and
the method further comprises, based on identifying that a UI is included in the received image, comparing information on a logo included in the UI included in the received image and the information on the logo included in the UI to which the received data corresponds.

12. The method as claimed in claim 11, wherein
the receiving, from the external device, the data corresponding to the UI for controlling the external device includes:
  receiving, from the external device, an image including the UI for controlling the external device, and
  obtaining the UI for controlling the external device from the received image.

13. The method as claimed in claim 11, wherein
the method further comprises, based on identifying that a UI is included in the received image:
  obtaining the information on the location of the UI element in the UI included in the received image by identifying an area in the received image in which a content is displayed and an area in the received image in which a UI is displayed, and
  obtaining the information on the structure of the UI element in the UI included in the received image by extracting a feature area of the UI included in the received image.

14. The method as claimed in claim 11, wherein
the comparing the information on the logo included in the UI included in the received image and the information on the logo included in the UI to which the received data corresponds compares the information on the logo included in the UI included in the received image and the information on the logo included in the UI to which the received data corresponds, to identify whether a provider that provides a content via the external device has changed.

15. The method as claimed in claim 14, further comprising, based on identifying that a provider that provides a content via the external device has changed:
providing a guide message that the provider has changed.

16. The method as claimed in claim 10, further comprising:
receiving a user command input to the electronic apparatus from the remote controller for controlling the electronic apparatus or input to the electronic apparatus through a user interface of the electronic apparatus;
providing, to the external device, a request for an image according to the received user command, and
in accordance with an image being received from the external device based on the request, identifying an area in the image received based on the request in which a content is displayed and an area in the image received based on the request in which a UI is displayed.

17. The method as claimed in claim 10, further comprising:
receiving, from the external device, information on the external device;
storing the received information on the external device in the memory; and
after storing the received information on the external device, and after the external device has been connected again to the electronic apparatus after being disconnected from the electronic apparatus,
  receiving information on the external device connected again to the electronic apparatus, and
  identifying whether a provider that provides a content to the electronic apparatus through the external device has changed by comparing the information on the external device stored in the memory with the received information on the external device connected again.

18. An electronic apparatus, comprising:

at least one memory configured to store at least one instruction; and at least one processor configured to execute the at least one instruction to perform a process including:

receiving, from an external device, data corresponding to a user interface (UI) for controlling the external device, obtaining, from the received data, information on structure and location of a UI element in the UI, based on an image being received by the electronic apparatus from the external device:

identifying whether a UI is included in the received image, based on identifying that a UI is included in the received image:

comparing information on structure and location of a UI element in the received image with the information on the structure and the location of the UI element in the UI obtained from the received data identifying, based on the compared information, a similarity value between the information on the structure and the location of the UI element in the UI included in the received image and the information on the structure and the location of the UI element in the UI obtained from the received data, identifying, based on the identified similarity value being equal to or more than a predetermined value, that there is not a change from the UI to which the received data corresponds to the UI included in the received image, and identifying, based on the identified similarity value being less than the predetermined value, that there is a change from the UI to which the received data corresponds to the UI included in the received image, and based on identifying that there is a change from the UI to which the received data corresponds to the UI included in the received image:

retraining a trained model for obtaining the information on the structure and the location of the UI element in the UI obtained from the received data, storing the information on the structure and the location of the UI element in the UI obtained from the received data in the at least one memory, matching a function of the UI included in the received image with a control button of a remote controller for controlling the electronic apparatus, and storing a result of the matching in the at least one memory.

* * * * *